United States Patent
Caldwell et al.

(10) Patent No.: US 6,349,093 B1
(45) Date of Patent: *Feb. 19, 2002

(54) AUTOMATED REMOTE PROVISIONING TECHNIQUE

(75) Inventors: James L. Caldwell, DeMossville, KY (US); Hossein Eslambolchi, Basking Ridge, NJ (US); Houssam Halabi, Freehold, NJ (US); James Michael Hopkins, Morristown, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,465

(22) Filed: Oct. 7, 1997

(51) Int. Cl.[7] ............................................. H04R 11/04
(52) U.S. Cl. ..................................................... 370/259
(58) Field of Search .................. 370/259, 389, 370/395, 522, 401, 351, 462, 461, 468, 535, 386, 396, 443, 454, 286, 352, 402, 403, 464, 431, 434, 437, 439, 438, 447, 360, 361, 356, 369, 384, 486; 379/201, 410, 408, 202; 381/63, 64, 71; 333/18

(56) References Cited

U.S. PATENT DOCUMENTS

| | | | | |
|---|---|---|---|---|
| 5,812,533 A | * | 9/1998 | Cox et al. | 370/409 |
| 5,943,412 A | * | 8/1999 | Courvoisier | 379/220 |
| 6,002,689 A | * | 12/1999 | Christie et al. | 370/401 |
| 6,049,550 A | * | 4/2000 | Baydar et al. | 370/358 |

* cited by examiner

*Primary Examiner*—Dang Ton
(74) *Attorney, Agent, or Firm*—Robert B. Levy

(57) ABSTRACT

Provisioning of dedicated service in a communications network is made more efficient by creating a service path, (200) that includes a permanent service communications link (230) between an automatically remotely provisionable cross-connect system (240) and a network gateway element (240), such as a cross-connect device or a telecommunications switch. The service communications link remains active to carry traffic notwithstanding whether the automatically remotely provisionable cross-connection system is provisioned to provide dedicated subscriber service, or to terminate such service. In this way, service may be re-provisioned by appropriately provisioning the cross-connect device without the need to dispatch a technician to re-establish a link between the cross-connect system and the network gateway device.

15 Claims, 6 Drawing Sheets

AUTOMATED REMOTE PROVISIONING TECHNIQUE

TECHNICAL FIELD

This invention relates to an inventory technique for Digital Signal Level 1 equipment enabling efficient provisioning for dedicated subscribers and for network needs.

BACKGROUND ART

Most providers of telecommunications services, such as AT&T, typically offer both dedicated and non-dedicated service. Equipment to provide service is inventoried and assigned at the DS1 level as individual components. Subscribers who only want a connection through the service provider's network for the duration of a call seek non-dedicated service. In providing non-dedicated service, the service provider establishes a path through its network to the called party upon initiation of a call from the calling party. After completion of the call, the service provider tears down the previously established path. For each successive call made by a subscriber under non-dedicated service, the service provider establishes a path and thereafter tears it down.

Many businesses and institutions that initiate large volumes of telecommunications traffic to a single location, such as a branch office or remote facility, achieve greater efficiency and reduced costs by utilizing a dedicated network path to route such traffic. In contrast to the transient network path associated with non-dedicated service, the network path associated with dedicated service exists before call initiation and remains after call completion. In other words, the network path associated with dedicated service remains available so long as the subscriber requests such service, regardless of the existence of any traffic.

Moreover, within a telecommunications network itself, certain paths are dedicated for carrying non-dedicated, as well as dedicated traffic. For example, a path between two pieces of network equipment, such as a telecommunications switch, and a digital cross-connect system, may be dedicated for carrying conventional switched subscriber service. service. In other words, such a path may carry non-dedicated service, yet remain in place following termination of a call.

The process by which a provider of telecommunications services establishes a path for dedicated service is known as provisioning. Most telecommunications service providers provision a dedicated path, such as a T1 trunk, in the following manner. First, a subscriber makes a service request to the service provider, typically by telephone, facsimile or e-mail. Upon receipt of the request, the service provider takes inventory of its existing inventory of trunks. From its available trunk inventory, the service provider selects an appropriate route that will satisfy the requesting subscriber's requirements.

Part of the provisioning process invariably involves the creation by the service provider of one or more "service paths." For purposes of discussion, a service path comprises an intra-office equipment assembly that includes a remotely provisionable network element, typically a remotely provisionable digital cross-connect system (DCS), a service communications link, and a network gateway device, such as a telecommunications switch, a non-provisionable cross-connect system, a multiplexer, or combination of such gateway devices linked to the service provider's network. Presently, a technician physically wires a path between the remotely provisionable DCS system and the network gateway device to establish the service communications link portion of the service path upon receipt of a provisioning request. Should the subscriber request termination (de-provisioning) of the previously requested service, a technician disconnects the previously wired service communications link. In practice, the technician's time in connecting and disconnecting the service communications link represents most of the effort and expense associated with such provisioning and de-provisioning requests. Often, much of the delay incurred in satisfying a subscriber request for a change in service stems from delays in connecting and disconnecting the service communications link within the service path.

Thus, there is a need for a technique for reducing the effort needed to establish a service path when provisioning dedicated service.

BRIEF SUMMARY OF THE INVENTION

Briefly, the present invention concerns a method for efficiently provisioning a network, for example, a telecommunications network, in response to a subscriber's request for dedicated service. To efficiently provision the network, at least one service path is established by and inventoried (tracked in a data base) creating a durable (permanent) service communications link between a remotely provisionable network element, such as a digital cross-connect system (DCS), and a network gateway element, such as a telecommunications switch, or a provisionable cross-connect system. The durable communications link is established before the receipt of the subscriber's request and remains in place as an idle link upon termination of the service previously requested by the subscriber. To satisfy a subscriber's request for dedicated service, the service provider remotely provisions the remotely-provisionable network element (i.e., the digital cross-connect system) to provide a communications path through that element and onto the durable service communications link. In this way, the remotely provisionable cross-connect system and the durable communications service link carry traffic to the gateway element for transmission across the service provider's network to an end point.

In practice, the remotely provisionable element may be re-provisioned upon termination of the requested subscriber service. However, the durable service communications link remains in place. Thus, to re-provision service upon receipt of a subsequent subscriber request, only the remotely provisionable element need be provisioned. With the durable service communications link in place, there is no need for a technician to re-establish the link to provision or terminate subscriber service, thus saving time and effort.

DETAILED DESCRIPTION

Figure 1:
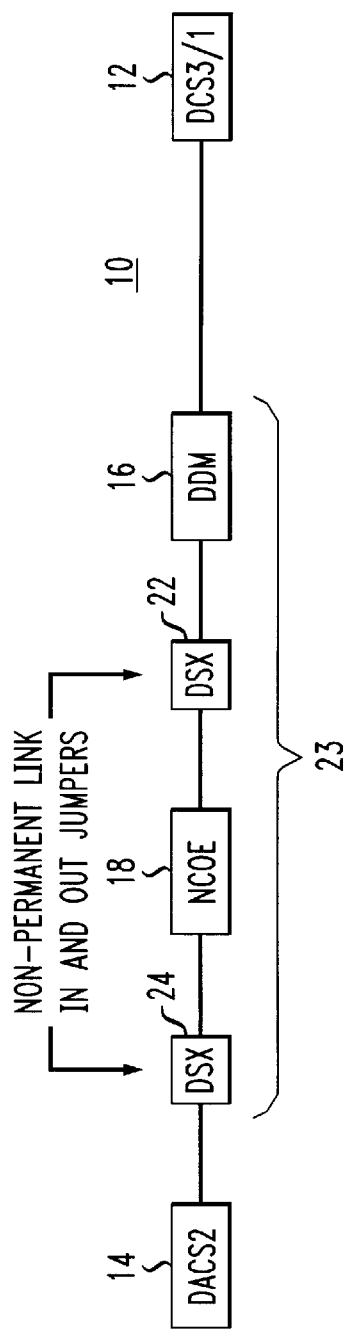
FIG. 1 illustrates a portion of a network in accordance with the prior art including a non-durable service communications link.

FIG. 1 illustrates a portion of a prior art network, such as a telecommunications network, that includes a service path 10 comprised of at least one remotely-provisionable, digital cross-connect system (DCS) 12, typically comprised of a DCS 3/1 cross-connect system manufactured by Alcatel of France. The service path 10 of the prior art also includes a non-durable (i.e., non-permanent) communications link 13 that couples the DCS 12 to a network gateway element 14, such as digital -connect system, e.g., a DACS 2 cross-connect system manufactured by Lucent Technologies, Murray Hill, N.J.). In the illustrated embodiment, the non-durable communications link 13 includes a multiplexer 16, such as a model DDM multiplexer manufactured by Lucent Technologies. Additionally, the link 13 includes a piece of Network Channel Office Equipment (NCOE) 18 linked to the multiplexer 16 and the DCS 14 via a pair of non-remotely provisionable cross-connect systems (DSXs) 22 and 24, typically manufactured by Lucent Technologies. The NCOE 18 typically comprises a signal monitor or the like.

The link 13 is transient (non-durable). In practice, a technician manually establishes the link 13 by appropriately configuring one or more jumpers (not shown) associated with each of the DSXs 22 and 24 upon receipt of a subscriber's request for dedicated service. Upon termination of that service, the technician disables the link 13 by removing it. Manual establishment of the link 13 plays a major role in the prior-art provisioning process as shown by reference to FIG. 3. The prior art provisioning process commences upon receipt by the telecommunications service provider of a subscriber's request for dedicated service, such as DS1 service (step 100). One or more representatives of the service provider, (typically a "case" team) review the request to determine feasibility (step 110). Assuming feasibility, one or more service provider designers and/or engineers then commence "design" of the path needed to implement the requested service (step 120). In actuality, the designers/engineers first take inventory of the resources, such as trunks and cross-connect systems, available to the service provider. After taking inventory, the designers/engineers then remotely provision at least one remotely provisionable DCS, such as the DCS 12 of FIG. 1 to provide a path for subscriber traffic into an office (not shown) maintained by the service provider for transmission on a service path, such as the service path 10 of FIG. 1.

Following step 120, a technician, comprising part of the service provider's On-Site Work force (OSWF), performs the necessary wiring to create the service communications link 13 of FIG. 1 (step 130) and thereby complete the service path 10 of FIG. 1. In other words, the technician configures the appropriate jumper associated with each of the non-remotely provisionable DCXs 22 and 24 of FIG. 1 to complete the service path 10. After the technician sets the appropriate jumpers, one or more technicians at a Plant Control Office (PCO) commences an end-to-end test of the just-established service path (step 140). The case team that received the initial subscriber's request reviews the test results and any other information developed thus far (step 150) before turning on service for the subscriber (step 160).

Figure 2:
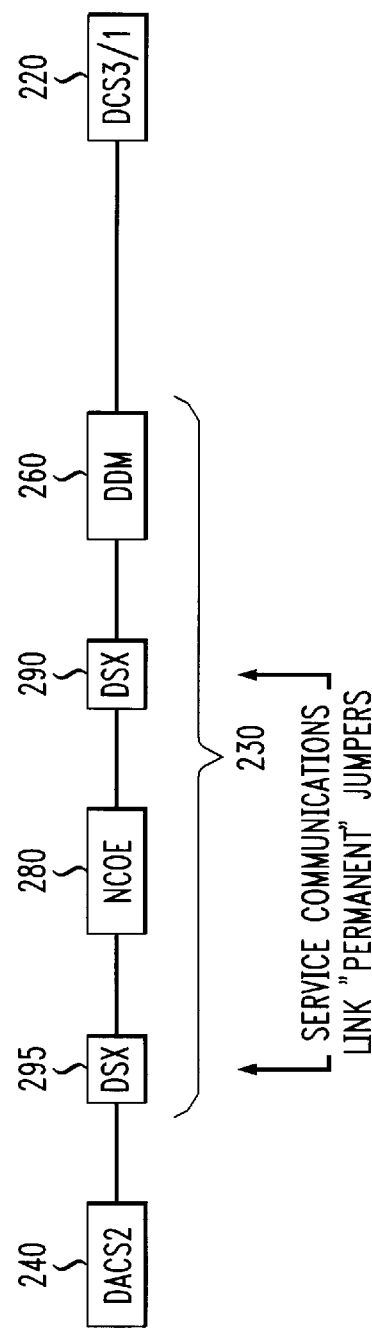
FIG. 2 illustrates a portion of a communications network in accordance with the invention including a durable (permanent) service communications link.

FIG. 2 shows a portion of a network that includes a service path 200 in accordance with the invention. Like the service path 10 of FIG. 1, the service path 200 includes at least one remote-controllable, automatically provisionable digital cross-connect system 220, typically a DCS 3/1 cross-connect system manufactured by Alcatel. The service path 200 of the invention also includes a durable (permanent) service communications link 230 that couples the DCS 220 to a network gateway element 240, typically, a DACS 2 cross-connect system manufactured by Lucent Technologies. In the illustrated embodiment, the durable communications link 230 includes a multiplexer 260. Further, the durable service communications link 230 a piece of Network Channel Office Equipment (NCOE) 280 linked to the multiplexer 260 and the DCS 240 via a pair of non-remotely provisionable cross-connect systems (DSXs) 290 and 295, respectively.

The communications link 230 of the invention differs in one major respect from the prior-art communications link 13 of FIG. 1 in that the communications link 230 remains permanently in place and is inventoried (i.e., recorded in a data base) as being permanent. As discussed above, the jumpers associated with the DSXs 22 and 24 of FIG. 1 are installed and removed at the initiation and termination, respectively, of a subscriber's service request. In contrast, the jumpers of the DCXs 290 and 295 remain in place prior to the initiation provisioning and following termination of service so that the durable link 230 exists "permanently" and is appropriately recorded in the data base that lists the status of all network paths. In other words, the link 230 remains active between the DCS 220 and the DCS 240 at all times. During intervals other than when the link 230 is active to carry dedicated subscriber traffic, the link remains in an idle state and is usable for restoration purposes. In contrast, the link 13 of FIG. 1 immediately becomes inactive upon removal of the jumpers of DSX 22 and DSX 24 following termination of a subscriber's service request, and is unusable for restoration purposes.

Figure 4:
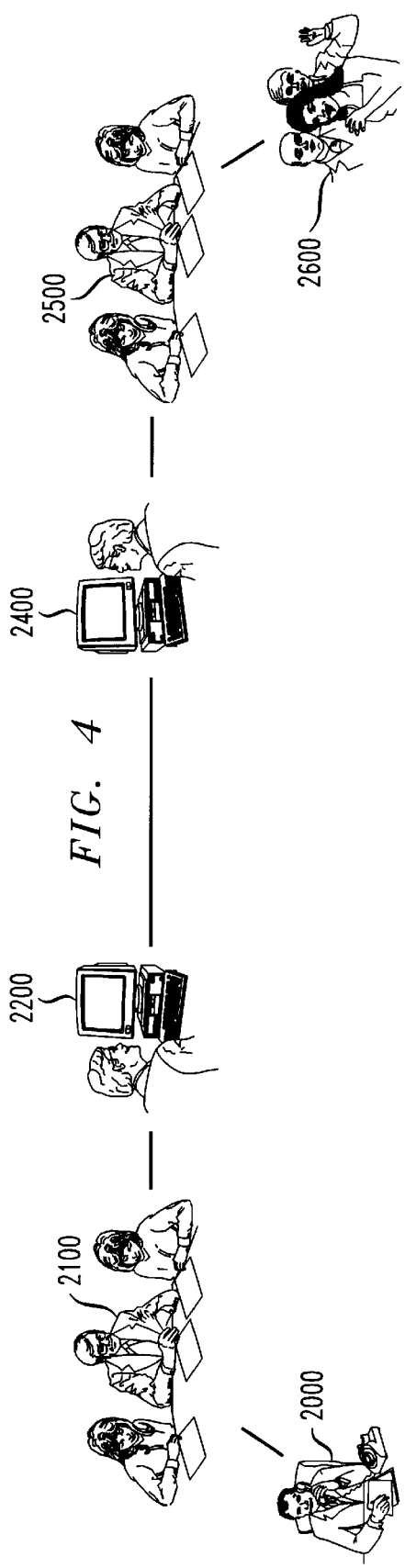
FIG. 4 illustrates the steps associated with provisioning the network of the invention depicted in FIG. 3.

The permanency of the link 230 (as well as its inventory status as permanent) renders the process of provisioning more efficient, as may be appreciated by reference to FIG. 4 that illustrates provisioning process of the invention. As seen in FIG. 4, the provisioning process of the invention commences upon receipt of by the telecommunications service provider of a subscriber's request for dedicated service, such as DS1 service (step 2000). One or more representatives of the service provider, (typically a "case" team) review the request to determine feasibility (step 2100). Assuming feasibility, one or more service provider designers and/or engineers then commences "design" of the path needed to implement the requested service (step 2200). In actuality, the designer first takes inventory of the resources available to the service provider. After taking inventory, the designers and/or engineers then remotely provision at least one remotely provisionable DCS, such as the DCS 220 of FIG. 1, to provide a path for subscriber traffic into an office (not shown) maintained by the service provider.

Once the designers/engineers remotely provision each remotely provisionable DCS during step 2200, no further activity is necessary to physically realize the service path 200 of FIG. 2 since the service communications link 230 remains continuously active. Thus, in contrast to the provisioning process of FIG. 3, no need exists to dispatch a technician from the on-site work force to create the link, as required with the prior art provisioning process of FIG. 3.

Following step 2200 of FIG. 4, one or more technicians at a Plant Control Office (PCO) complete any necessary remote cross-connections and then commence an end-to-end test of the just-established service path (step 2400). The individual or team that received the initial subscriber's request reviews the test results and any other information developed during the process thus far (step 2500) before turning on service for the subscriber (step 2600).

Figure 3:
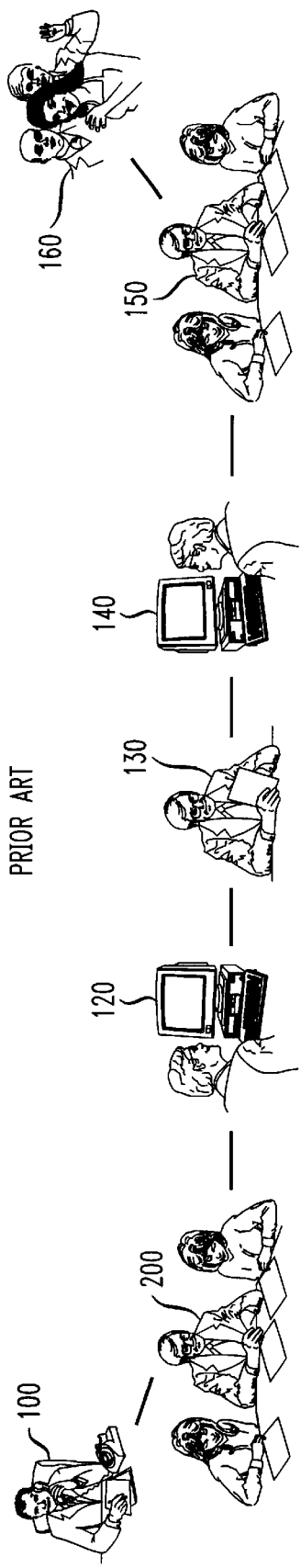
FIG. 3 illustrates, in flow chart form, the sa required to provision the prior-art network of FIG. 1.

In comparison to the prior-art provisioning process of FIG. 3, the provisioning process of the invention shown in FIG. 4 achieves increased efficiency because the existence of a permanent service communications link, and its recorded status in inventory, thus elimiating the need to manually establish the service communications link. Eliminating the need to manually establish the service communications substantially increases efficiency because errors resulting from configuring the jumpers associated with the DSXs to establish and terminate service are eliminated.

Figure 5:
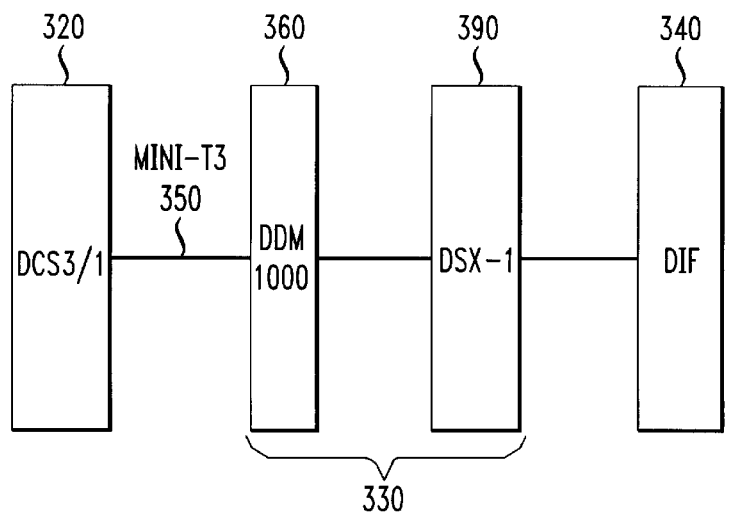
FIGS. 5–12 illustrate alternative preferred embodiments of the network of FIG. 3.

FIG. 5 depicts a service path 300 in accordance with a first alternative embodiment of the invention. The service path 300 comprises a remotely-provisionable DCS 320, typically a model DCS 3/1 system from Alcatel. A durable and permanently inventoried service communications link 330 couples the DCS 320 to a network gateway device 340, which, in the embodiment of FIG. 5, takes the form of a Digital Interface Frame (DIF), comprising a portion of a telecommunication switch, such as a 4ESS switch available from Lucent Technologies. The durable service communications link 330 of FIG. 5 includes a mini T3 trunk 350 running between the DCS 320 and a multiplexer 360, typically, a model DDM 1000 multiplexer, available from Lucent Technologies. A non-remotely provisionable cross-connect system (DSX) 390 links the multiplexer 360 to the DIF 340. As with the service communications link 230 of FIG. 3, the communications link 330 of FIG. 5 is durable (permanent) by virtue of the fact that the mini-T3 trunk 350 remains permanently connected between the DCS 320 and the multiplexer 360, and the link between the multiplexer 360 and the DIF 340, provided by the DSX 390, remains permanently connected, even during intervals other than when provisioned to provide dedicated service to a particular subscriber.

Figure 6:
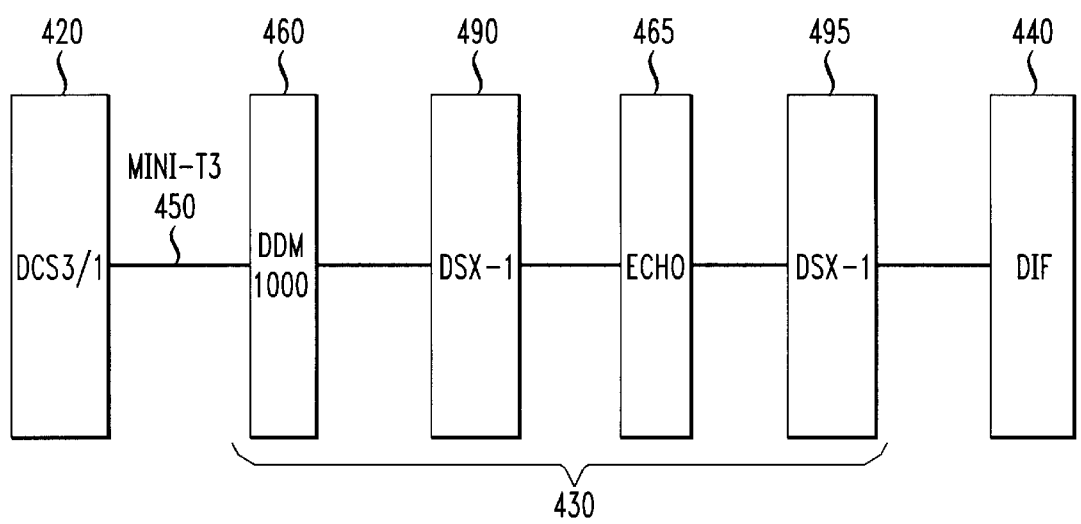

FIG. 6 shows a service path 400 in accordance with a second alternate embodiment of the invention. The service path 400 comprises a remotely-provisionable DCS 320, typically a model DCS 3/1 system from Alcatel. A durable service communications link 430 couples the DCS 420 to a network gateway device 440, which, in the embodiment of FIG. 6, takes the form of a Digital Interface Frame (DIF). The durable service communications link 430 of FIG. 6 includes a mini T3 trunk 450 running between the DCS 420 and a multiplexer 460, typically a model DDM 1000 multiplexer available from Lucent Technologies. A first non-remotely provisionable cross-connect system (DSX) 490 couples the multiplexer 460 to an echo cancellation system 465. A second DSX 495 couples the echo cancellation system 465 to the DIF 440. As with the service communications link 230 of FIG. 3, the communications link 430 is durable (permanent). The mini-T3 trunk 450 remains connected between the DCS 420 and the multiplexer 460, while the each of the DSXs' 490 and 495 remain permanently configured to link the multiplexer 460 and the DIF 440, respectively, to the echo cancellation system 465, even during intervals other than when provisioned to provide dedicated service to a particular subscriber.

Figure 7:
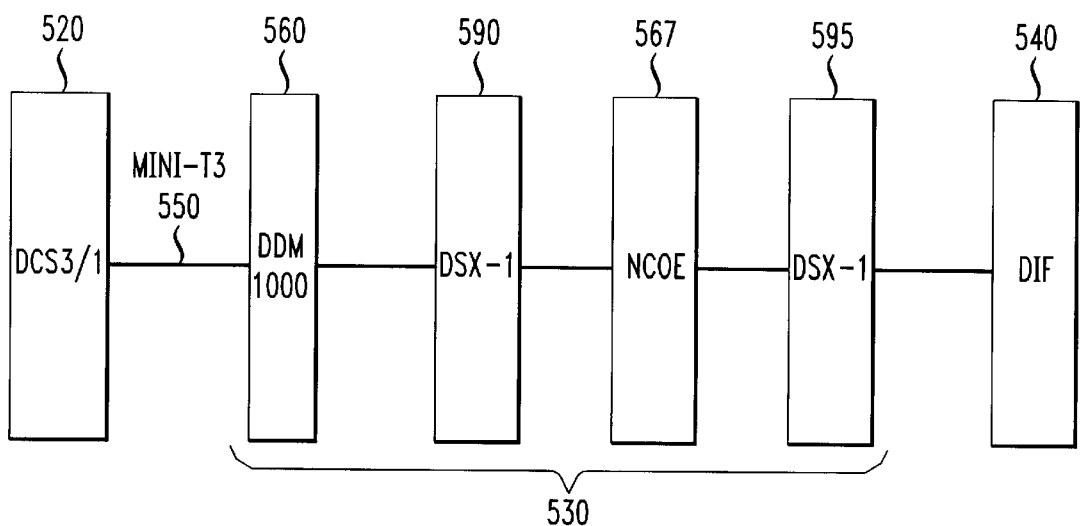

FIG. 7 shows a service path 500 in accordance with a third alternative embodiment of the invention. The service path 500 comprises a remotely-provisionable DCS 520, typically a model DCS 3/1 system from Alcatel. A durable service communications link 530 couples the DCS 520 to a network gateway device 540, which, in the embodiment of FIG. 7, takes the form of a Digital Interface Frame (DIF). The durable service communications link 530 of FIG. 7 includes a mini T3 trunk 550 running between the DCS 520 and a multiplexer 560, typically, a model DDM 1000 multiplexer available from Lucent Technologies. A first non-remotely provisionable cross-connect it system (DSX) 590 couples the multiplexer 560 to a piece of Network Central Office Equipment (NCOE) 567. A second DSX 595 couples the NCOE 567 to the DIF 540. As with the service communications link 230 of FIG. 3, the communications link 530 is durable (permanent). The mini-T3 trunk 550 remains permanently connected between the DCS 520 and the multiplexer 560, while the each of the DSXs' 590 and 595 remain permanently configured to link the multiplexer 560 and the DIF 540, respectively, to the NCOE 567, even during intervals other than when provisioned to provide dedicated to a particular subscriber.

Figure 8:
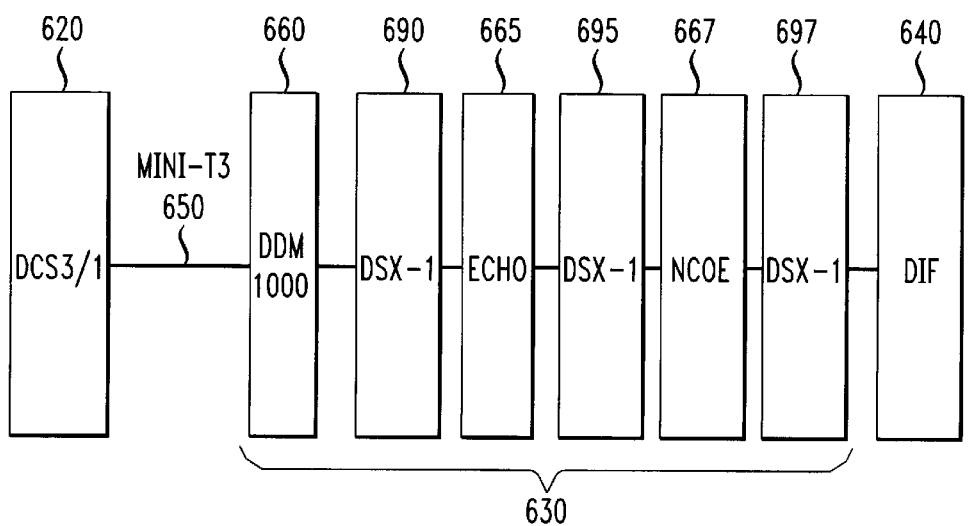

FIG. 8 shows a service path 600 in accordance with a fourth alternative embodiment of the invention. The service path 600 comprises a remotely-provisionable DCS 620, typically a model DCS 3/1 system from Alcatel. A durable service communications link 630 couples the DCS 620 to a network gateway device 640, which, in the embodiment of FIG. 8, takes the form of a Digital Interface Frame (DIF). The durable service communications link 530 of FIG. 8 includes a mini T3 trunk 650 running between the DCS 520 and a multiplexer 560, typically, a model DDM 1000 multiplexer available from Lucent Technologies. A first non-remotely provisionable cross-connect system (DSX) 690 couples the multiplexer 560 to an echo cancellation system 665. A second DSX 695 couples the echo cancellation system 665 to apiece of Network Central Office Equipment (NCOE) 667, while a third DSX 697 couples the NCOE 667 to the DIP 640. As with the service communications link 230 of FIG. 3, the communications link 630 is durable (permanent). The mini-T3 trunk 650 of the service communications link 630 remains permanently connected between the DCS 620 and the multiplexer 660, while the DSXs' 690, 695 and 697 remain configured to permanently link the multiplexer 660 to the echo cancellation system 665, the echo cancellation system to the NCOE 667, and the NCOE 667to the DIF 640, respectively, even during intervals other than when provisioned to provide dedicated to a particular subscriber.

Figure 9:
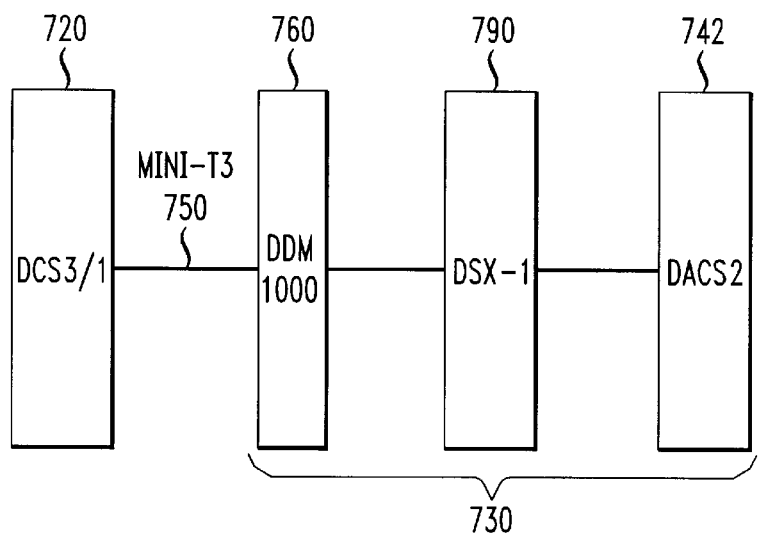

FIG. 9 depicts a service path 700 in accordance with a fifth alternative embodiment of the invention. The service path 700 comprises a remotely-provisionable DCS 720, typically a model DCS 3/1 system from Alcatel. A durable service communications link 730 couples the DCS 320 to a network gateway device 742, which, in the embodiment of FIG. 5, takes the form of a Digital Cross-connect System (DCS), such as a DACS 2 system available from Lucent Technologies. The durable service communications link 330 of FIG. 5 includes a mini T3 trunk 750 running between the DCS 720 and a multiplexer 760, typically a model DDM 1000 multiplexer available from Lucent technologies. A non-remotely provisionable cross-connect system (DSX) 790 couples the multiplexer 760 to the DACS 742. As with the service communications link 230 of FIG. 3, the service communications link 730 is durable (permanent) by virtue of the fact that the mini-T3 trunk 750 remains permanently connected between the DCS 720 and the multiplexer 760, and the DSX 790 remains permanently configured to couple the multiplexer 760 and the DCS 742, even during intervals other than when provisioned to provide dedicated service to a particular subscriber.

Figure 10:
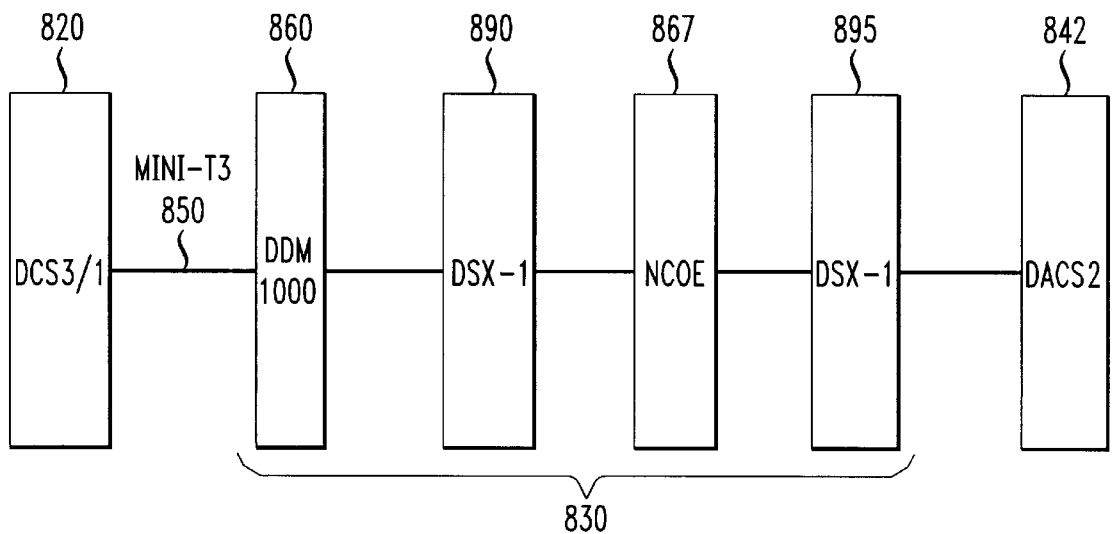

FIG. 10 shows a service path 800 in accordance with a sixth alternative embodiment of the invention. The service path 800 comprises a remotely-provisionable DCS 820, typically a model DCS 3/1 system from Alcatel. A durable service communications link 830 couples the DCS 820 to a network gateway device 842, which, in the embodiment of FIG. 10, takes the form of a Digital Cross-connect System (DCS), such as a DACS 2 system available from Lucent Technologies. The durable service communications link 830 of FIG. 10 includes a mini T3 trunk 850 running between the DCS 820 and a multiplexer 860, typically, a model DDM 1000 multiplexer available from Lucent Technologies. A first non-remotely provisionable cross-connect system (DSX) 890 couples the multiplexer 860 to a piece of Network Central Office Equipment (NCOE) 867. A second DSX 895 couples the NCOE 867 to the DCS 842. As with the service communications link 230 of FIG. 3, the communications link 830 is durable permanent). The mini-T3 trunk 850 remains permanently connected between the DCS 820 and the multiplexer 860, while the each of the DSXs' 890 and 895 remain permanently configured to link the multiplexer 860 and the DCS 842, respectively, to the NCOE 867, even during intervals other than when provisioned to provide dedicated to a particular subscriber.

Figure 11:
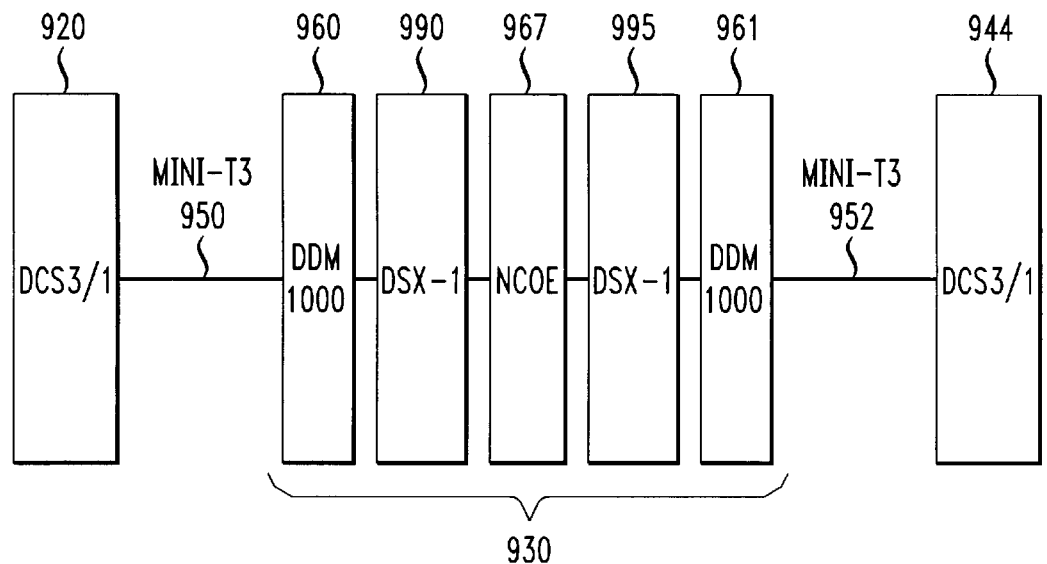

FIG. 11 shows a service path 900 in accordance with a seventh alternative embodiment of the invention. The service path 900 comprises a remotely-provisionable DCS 920, typically a model DCS 3/1 system from Alcatel. A durable service communications link 930 couples the DCS 920 to a network gateway device 944, which, in the embodiment of FIG. 11, takes the form of a model DCS 3/1 cross-connect system from Alcatel. The durable service communications link 930 of FIG. 10 includes a first mini T3 bunk 950 running between the DCS 920 and a first multiplexer 960, typically a model DDM 1000 multiplexer available from Lucent Technologies. A first non-remotely provisionable cross-connect system (DSX) 990 couples the multiplexer 960 to a piece of Network Central Office Equipment (NCOE) 967. A second DSX 995 couples the NCOE 967 to a second multiplexer 961, coupled via a second mini T3 link 952 to the DCS 944. As with the service communications link 230 of FIG. 3, the communications link 930 is durable (permanent). The mini-T3 trunks 950 and 951 each remains permanently connected between each of the DCSs 920 and 944 and a separate one of the multiplexers 960 and 961, respectively. Likewise, each of the DSXs' 990 and 995 remain permanently configured to link the multiplexer 960 to the NCOE 967 and the NCOE to the multiplexer 961, respectively, even during intervals other than when provisioned to provide dedicated to a particular subscriber.

Figure 12:
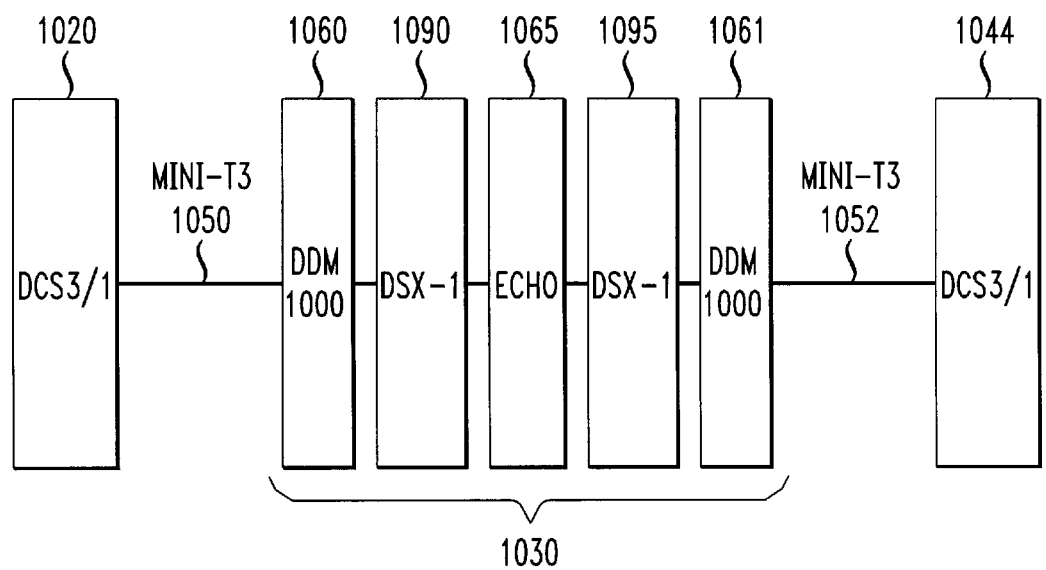

Lastly, FIG. 12 shows a service path 100 in accordance with an eighth alternative embodiment of the invention. The service path 1000 comprises a remotely-provisionable DCS 1020, typically a model DCS 3/1 system from Alcatel. A durable service communications link 1030 couples the DCS 1020 to a network gateway device 1044, which, in the embodiment of FIG. 12, takes the form of a model DCS 3/1 cross-connect system from Alcatel. The durable service communications link 1030 of FIG. 11 includes a first mini T3 trunk 1050 running between the DCS 1020 and a first multiplexer 1060, typically a model DDM 1000 multiplexer available from Lucent Technologies. A first non-remotely provisionable cross-connect system (DSX) 1090 couples the first multiplexer 1060 to an echo cancellation system 1065. A second DSX 1095 couples the echo cancellation system to a second multiplexer 1061coupled via a second mini T3 link 1052 to the DCS 1044. As with the service communications link 230 of FIG. 3, the communications link 1030 is durable (permanent). The mini-T3 trunks 1050 and 1051 each remains permanently connected between each of the DCSs 1020 and 1044 and a separate one of the multiplexers 1060 and 1061, respectively. Likewise, each of the DSXs' 1090 and 1095 remain permanently configured to link the multiplexer 1060 to the echo cancellation system 1065 and the echo cancellation system to the multiplexer 1061, respectively, even during intervals other than when provisioned to provide dedicated to a particular subscriber.

The foregoing describes a technique for provisioning a network for dedicated service by creating and inventorying a service path having a permanent service communications link to achieve efficient provisioning. While the present invention has been described with respect to creating and inventorying a service path in response to a subscriber request, the present technique is useful for creating a service path having a durable communications service link for carrying non-dedicated traffic. For example, it may desirable to create a service path having a durable link between a telecommunications switching system and a remotely provisionable digital cross-connect system for carrying non-dedicated traffic. The service path, and particularly, the durable service communications link remains in place even though other legs of the call are torn down following call completion.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for efficiently provisioning a network for dedicated service, comprising the steps of:

creating at least one traffic-carrying service path in the network between a provisionable network element and a network gateway element for carrying subscriber-originated traffic, the service path including a durable service traffic-carrying communications link established prior to receipt of a request for dedicated service and remaining in place as an idle path upon termination of the dedicated service request; and automatically remotely provisioning the remotely-provisionable network element to provide communication path therethrough and onto the service communications link in response to the request to establish the dedicated service to carry subscriber-originated traffic.

2. The method according to claim 1 wherein the gateway network element is automatically remotely provisionable and further including the step of automatically remotely provisioning the network gateway element.

3. The method according to claim 1 wherein the step of creating the service path includes the step of configuring at least one non-remotely provisionable cross-connect system in the service path to provide a permanent connection therethrough.

4. The method according to claim 1 wherein the step of creating the service path includes the step of configuring and inventorying each of a pair of non-remotely provisionable cross-connect system in the service path to provide a permanent connection therethrough.

5. A method for efficiently provisioning a network in response to a subscriber's request for dedicated service, comprising the steps of:

creating at least one traffic-carrying service path in the network between a provisionable network element and a network gateway element for carrying subscriber-originated traffic, the path including a permanent service traffic-carrying communications link established prior to receipt of the subscriber's request and remaining in place as an idle path upon termination of the dedicated service requested by the subscriber;

automatically provisioning the provisionable network element to provide a communication path through the element dedicated to the subscriber in response to the subscriber's request to establish the dedicated service for carrying subscriber-originated traffic; and automatically re-provisioning the provisionable network element to terminate the previously provided communication path through the element dedicated to the subscriber upon termination of the subscriber's request to establish the dedicated service.

6. A service path in a communications network for carrying dedicated traffic, comprising:

an automatically, remotely provisionable cross-connect system, a network gateway device; and a durable service traffic-carrying communications link permanently coupling the cross-connect system to the network gateway device and being established prior to provisioning of the automatically, remotely provisionable cross-connect system to carry subscriber-originated traffic onto said link and remaining active to carry traffic subsequent to provisioning of the automatically, remotely provisionable cross-connect system to terminate traffic onto the link.

7. The service path according to claim 6 wherein the service communications link includes:

a mini T3 trunk.

8. The service path according to claim 6 wherein the service communications link includes at least one non-remotely provisionable cross-connect system configured to provide a permanent connection thereacross.

9. The service path according to claim 6 wherein the service communications link includes at least a pair of non-remotely provisionable cross-connect system, each configured to provide a permanent connection thereacross.

10. The service path according to claim 6 wherein the service communications link includes at least one multiplexer.

11. The service path according to claim 10 wherein the service communications link includes a pair of multiplexers.

12. The service path according to claim 6 wherein the service communications link includes at least one echo cancellation system.

13. The service path according to claim 6 wherein the network gateway device comprises an automatically remotely provisionable cross-connect system.

14. The service path according to claim 6 wherein the network gateway device comprises digital interface frame (DIF) associated with a telecommunications switch.

15. The service path according to claim 6 wherein the service communications link includes a piece of network central office equipment (NCOE).

* * * * *